United States Patent
Ramsey et al.

(10) Patent No.: US 7,840,377 B2
(45) Date of Patent: Nov. 23, 2010

(54) DETECTING TRENDS IN REAL TIME ANALYTICS

(75) Inventors: Mark S. Ramsey, Kihei, HI (US); David A. Selby, Hampshire (GB); Stephen J. Todd, Hants (GB)

(73) Assignee: International Business Machines Corporation, Armonk, NY (US)

( * ) Notice: Subject to any disclaimer, the term of this patent is extended or adjusted under 35 U.S.C. 154(b) by 44 days.

(21) Appl. No.: 11/609,440

(22) Filed: Dec. 12, 2006

(65) Prior Publication Data

US 2008/0140471 A1    Jun. 12, 2008

(51) Int. Cl.
G06F 17/18 (2006.01)
(52) U.S. Cl. ...................................... 702/179; 702/182
(58) Field of Classification Search ................... 702/81, 702/84, 176, 177, 179, 182, 183, 187
See application file for complete search history.

(56) References Cited

U.S. PATENT DOCUMENTS

| | | | |
|---|---|---|---|
| 6,212,549 B1 * | 4/2001 | Page et al. | 709/205 |
| 6,643,625 B1 * | 11/2003 | Acosta et al. | 705/38 |
| 7,149,664 B1 * | 12/2006 | Firoiu et al. | 703/2 |
| 2003/0139905 A1 * | 7/2003 | Helsper et al. | 702/182 |
| 2004/0041846 A1 * | 3/2004 | Hurley et al. | 345/848 |
| 2005/0129143 A1 * | 6/2005 | Kang et al. | 375/316 |
| 2006/0126713 A1 * | 6/2006 | Chou et al. | 375/225 |
| 2006/0161648 A1 * | 7/2006 | Ding et al. | 709/224 |
| 2007/0011479 A1 * | 1/2007 | Pessolano | 713/323 |
| 2007/0156887 A1 * | 7/2007 | Wright et al. | 709/224 |

OTHER PUBLICATIONS

Javitz et al., "The SRI IDES Statistical Anomaly Detector", 1991 IEEE Computer Society Symposium on Research in Security and Privacy, 1991. Proceedings., May 20-22, 1991 pp. 316-326.*
IBM Technical Disclosure Bulletin NN9004210, "Statistically Based Adaptive Threshold". Apr. 1, 1990.*
IBM Technical Disclosure Bulletin NN9004210, "Statistically Based Adaptive Threshold". Apr. 1, 1990.*
IBM Technical Disclosure Bulletin NN9004210, "Statistically Based Adaptive Threshold". Apr. 1, 1990.*

* cited by examiner

*Primary Examiner*—Jeffrey R West
(74) *Attorney, Agent, or Firm*—Anna Linne; Hoffman Warnick LLC

(57) ABSTRACT

A system, method and program product for processing a stream of data to detect trends in real time. A system is provided comprising: a real time statistical processing system for updating a running value each time a new data event is obtained, wherein the running value is calculated based on a previously calculated running value and a difference DV between a current data event value ($V_i$) and a previous data event value ($V_{i-1}$); and an analysis system that analyzes the running value after it is updated to detect trends.

17 Claims, 1 Drawing Sheet

US 7,840,377 B2

DETECTING TRENDS IN REAL TIME ANALYTICS

FIELD OF THE INVENTION

The invention relates generally to analyzing event data, and more particularly to a system and method that detects trends in real time data analysis.

BACKGROUND OF THE INVENTION

There exist numerous applications in which real time data analysis may be required. For example, data events may be collected in a financial setting to identify potentially fraudulent activity, in a network setting to track network usage, in a business setting to identify business opportunities or problems, etc. Often, it may be necessary to examine individual data events as they occur to immediately investigate any suspect behavior. Challenges however arise when analyzing data events in real time since historical data values are typically necessary to identify trends and patterns. Namely, accessing historical data can be a relatively slow process, and thus limits real time processing.

There exist various known techniques (e.g., running estimates, moving windows, etc.) for analyzing data events in real time (or near real time). In such techniques, the historical data is essentially "built in" to the currently calculated estimate, thus providing a statistical summary in a single value (or set of values). Such techniques utilize little or no historical data to provide a statistical analysis of detected event values. Instead, they, e.g., maintain a running value, which is updated each time a new data event value is collected.

In some applications, it may be desirable to identify an overall trend in a stream of data events as they occur in real time. Based on such identification, a first level alert of a trend could be issued and responded to in an appropriate manner. However, because real time analysis techniques do not have the luxury of examining significant amounts of historical data, current techniques lack an effective ability to identify overall trends. Accordingly, a need exists for a system and method of detecting trends in a real time data analysis setting.

SUMMARY OF THE INVENTION

The present invention addresses the above-mentioned problems, as well as others, by providing a real time system, method and program product for detecting trends in a stream of data events. In a first aspect, the invention provides a system for processing a stream of data events, comprising: a real time statistical processing system for updating a running value each time a new data event is obtained, wherein the running value is calculated based on a previously calculated running value and a difference DV between a current data event value ($V_i$) and a previous data event value ($V_{i-1}$); and an analysis system for analyzing the running value after it is updated.

In a second aspect, the invention provides a computer program product stored on a computer readable medium, which when executed, processes a stream of data events to detect trends, the program product comprising: program code configured for updating a running value each time a new data event is obtained, wherein the running value is calculated based on a previously calculated running value and a difference DV between a current data event value ($V_i$) and a previous data event value ($V_{i-1}$); and program code configured for analyzing the running value after it is updated.

In a third aspect, the invention provides a method of processing a stream of data events to detect trends, comprising: obtaining a new data event value; updating a running value based on a previously calculated running value and a difference DV between the new data event value ($V_i$) and a previous data event value ($V_{i-1}$); and analyzing the running value after it is updated.

The disclosed features are thus useful in, among other things, identifying longer term trends and filtering out the short term variations.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Figure 1:
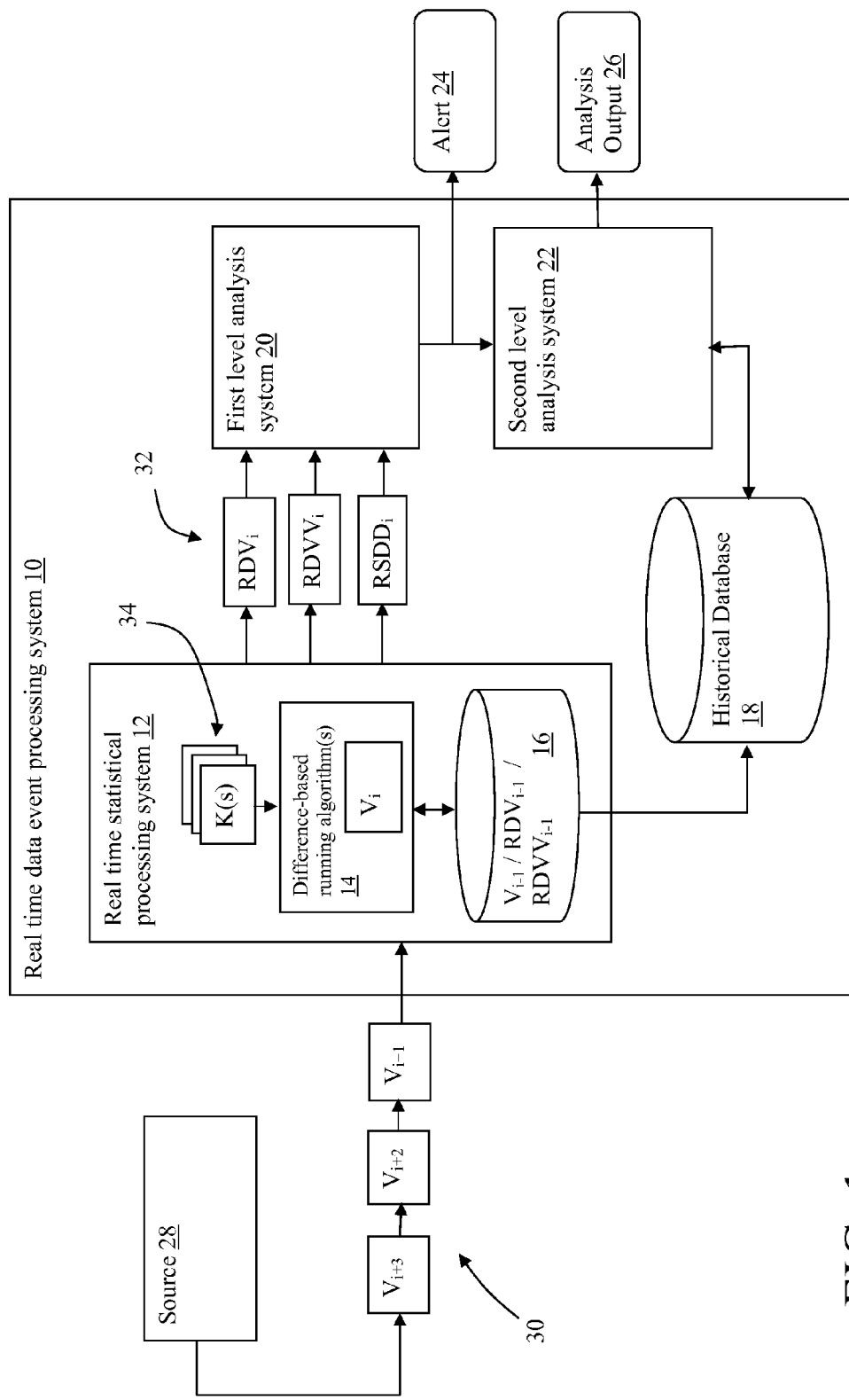
FIG. 1 depicts a real time data event processing system in accordance with an embodiment of the present invention.

Referring now to drawings, FIG. 1 depicts a real time data event processing system 10 that receives and processes a stream of data events (i.e., "stream") 30 from a source 28. Data contained within the stream 30 may comprise any type of information that is created, generated, transmitted and/or received (i.e., "obtained") over time. Information may for instance comprise business data, research data, scientific data, technical data, financial data, etc. In some applications, stream 30 will comprise values, e.g., withdrawal amounts, bit usage, customer activity, etc., whereas in other applications, stream 30 may simply comprise binary values resulting from an occurrence or non-occurrence of an event, e.g., a login, a withdrawal, building entry, etc. Although the embodiment of FIG. 1 is shown processing a single stream 30, it is understood that real time data event processing system 10 can be implemented to process any number of streams, i.e., one or more.

Real time data event processing system 10 generally includes: (1) a real time statistical processing system 12 that calculates/updates one or more statistical summaries or running values 32 each time a new data event $V_i$ is obtained; (2) a first level analysis system 20 that analyzes the running value(s) 32 in real time to provide an alert 24, if warranted; and (3) a second level analysis system 22 for analyzing the alert 24 and generating analysis output 26 in a non-real time fashion using historical data from historical database 18. Historical database 18 may, for example, store a large number of previously obtained values $V_{i-n}$ and previously calculated running values 32.

Each time a new data event value $V_i$ is inputted, real time statistical processing system 12 calculates and updates the one or more running values 32 using one or more difference-based running algorithms 14. For the purposes of this disclosure, difference-based running algorithms 14 comprise computations that calculate each running value 32 based on the previously calculated running estimate and the difference DV between a current data event value ($V_i$) and a previous data event value ($V_{i-1}$). Thus, the previously calculated running values (e.g., $RDV_{i-1}$ and $RDVV_{i-1}$, described in further detail below), as well as the previous data event value ($V_{i-1}$) are stored in a temporary cache 16 by real time statistical processing system 14 for processing the next data event value $V_i$. For the purposes of the disclosure, the term cache 16 refers to any high speed memory that allows data to be quickly stored and retrieved.

In the embodiment described with reference FIG. 1, three difference-based running algorithms 14 are contemplated. However, it is understood that any difference-based running algorithm could be utilized and therefore falls within the scope of the invention. The first algorithm (running mean) uses exponential smoothing to compute a running value RDV on the change of value DV between a previous data event value and a current data event value, as follows:

$$RDV_i=(1-K)*DV+K*RDV_{i-1},$$

where $DV=V_{i-1}-V_i$ and K is a half life based smoothing factor that can be selected in any manner. Using this algorithm, declines (or rises) in DV between two consecutive data events will be smoothed so as not to be significantly reflected in RDV, and thus, e.g., not cause an alert 24 by first level analysis system 20. However, a series of declining (or rising) data events will be reflected in RDV and can thus be used to cause an alert 24. For example, if RDV is less that a given threshold and an alert 24 occurs, this indicates that there is a significant declining trend in the underlying V values.

A second difference-based algorithm (running square) takes the square of the difference DV to compute a running value RDVV as follows:

$$RDVV_i=(1-K)*DV^2+K*RDVV_{i-1},$$

where $DV=V_{i-1}-V_i$ and K is a half life based smoothing factor that can be selected in any manner.

A third difference-based algorithm (running standard deviation) is based on both the running mean algorithm and the running square algorithm to compute RSDD as follows:

$$RSDD=\text{sqrt}(RDVV-RDV^2).$$

The running standard deviation RSDD can be used to, e.g., indicate whether a gradual decline (as indicated by a low value of RDV) was a steady decline or an irregular decline. For instance, if the value RSDD is low compared to the value of RDV, this is an indication that RDV is declining in a steady and fairly reliable manner. However, if RSDD is large, this indicates significant variations in the decline, and indicates that the decline may not have been reliably identified.

The value of K may be chosen to give a reasonable period over which a decline is to be tested. K can be related to the time by a decay constant k and its relationship to the half-life of an event. For example, K may be implemented as an exponential smoothing factor:

$$K=0.5^{(1/H)}$$

where H is a half-life value that can be selected by a user or system. The half-life is the time over which the effect of a particular observation has decayed to half of the original strength. With exponential decay, the effect never completely disappears, so half-life is a common and convenient concept to describe the rate of decay. Accordingly, half-life H provides an intuitive mechanism for setting the parameters.

As the computations performed by real time statistical processing system 12 are relatively inexpensive, it is feasible to utilize different K values 34 to analyze different half-lives, e.g., different K values 34 can be selected to provide daily, weekly, monthly, quarterly, yearly, and five year trends. In other applications different time scales, e.g. milliseconds or seconds, could be obtained. In cases where multiple K values 34 are utilized, real time statistical processing system 12 will generate multiple running value sets 32 (not shown).

In addition to providing an alert 24, analysis systems 20, 22 may provide mechanisms (e.g., algorithms, programs, heuristics, modeling, etc.) for examining running values 32 to provide some analysis, e.g., identifying potentially fraudulent activities, identifying trends and patterns, identifying risks, problems, opportunities, etc. For example, a low running value RDV may indicate an unusual drop in customer activity, an unusual amount of bandwidth usage in a network, etc. In a simple application, first level analysis system 20 might compare a running value 32 to a threshold value. If the running value 32 is above (or below) the threshold value, first level analysis system 20 may issue an alert 24. Alert 24 may also be passed to second level analysis system 22 to perform a more thorough analysis, the result of which may be generated in the form of an analysis output 26. Historical information from historical database 18 may be retrieved in a non-real time fashion.

In general, real time data event processing system 10 may be implemented using any type of computing device, and may be implemented as part of a client and/or a server. Such a computing system generally includes a processor, input/output (I/O), memory, and a bus. The processor may comprise a single processing unit, or be distributed across one or more processing units in one or more locations, e.g., on a client and server. Memory may comprise any known type of data storage and/or transmission media, including magnetic media, optical media, random access memory (RAM), read-only memory (ROM), a data cache, a data object, etc. Moreover, memory may reside at a single physical location, comprising one or more types of data storage, or be distributed across a plurality of physical systems in various forms.

I/O may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus provides a communication link between each of the components in the computing system and likewise may comprise any known type of transmission link, including electrical, optical, wireless, etc. Additional components, such as cache memory, communication systems, system software, etc., may be incorporated into the computing system.

Access to real time event data processing system 10 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system comprising a real time data event processing system 10 could be created, maintained and/or deployed by a service provider that offers the functions described herein for customers. That is, a service provider could offer to provide event processing as described above.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part or all of the invention could be implemented in a distributed manner, e.g., over a network such as the Internet.

The present invention can also be embedded in a computer program product, which comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A system for processing a stream of data events, comprising:
    at least one computing device, including:
    a real time statistical processing system for updating a first and a second running value each time a new data event is obtained, wherein the first and second running values are calculated based on a previously calculated running value and a difference DV between a current data event value ($V_i$) and a previous data event value ($V_{i-1}$), wherein the first running value $RDV_i=(1-K)*DV+K*RDV_{i-1}$ and the second running value $RDVV_i=(1-K)*DV^2+K*RDVV_{i-1}$ in which K is a half-life based smoothing factor that dictates a period over which a decline in data event values is analyzed, and wherein a third running value RSDD comprises a running standard deviation computed by the real time statistical processing system as follows: $RSDD=sqrt(RDVV_i-RDV_i^2)$; and
    an analysis system for analyzing each running value after it is updated to detect trends in the stream of data events.

2. The system of claim 1, wherein the real time statistical processing system includes a cache for storing each previously calculated running value and each previous data event value.

3. The system of claim 1, further comprising a first level analysis system for generating an alert in real time when at least one running value breaks a threshold.

4. The system of claim 3, further comprising a second level analysis system that analyzes each running value using historical data in a non-real time fashion.

5. The system of claim 1, wherein the detect trends in the stream of data events identifies potential fraudulent activity in a financial setting.

6. The system of claim 1, wherein the detect trends in the stream of data events tracks network usage.

7. The system of claim 1, wherein the detect trends in the stream of data events identifies opportunities in a business setting.

8. The system of claim 1, wherein the detect trends in the stream of data events identifies problems in a business setting.

9. The system of claim 1, wherein the detect trends in the stream of data events identifies risks in a business setting.

10. The system of claim 1, wherein the data events are selected from a group consisting of: business data, research data, scientific data, technical data and financial data.

11. A non-transitory computer readable medium storing a computer program product, which when executed by a computing device, processes a stream of data events to detect trends, the program product comprising:
    program code configured for updating a running value each time a new data event is obtained, wherein the running value $RDVV_i$ is calculated based on a previously calculated running value and a difference DV between a current data event value ($V_i$) and a previous data event value ($V_{i-1}$) and is calculated as $(1-K)*DV^2+K*RDVV_{i-1}$, where K is a half-life based smoothing factor that dictates a period over which a decline in data event values is analyzed;
    program code configured for determining a running mean calculated as follows: $RDV_i=(1-K)*DV+K*RDV_{i-1}$;
    program code configured for determining a running standard deviation calculated as follows: $RSDD=sqrt(RDVV_i-RDV_i^2)$;
    program code configured for analyzing the running value, running mean, and running standard deviation to detect trends in the stream of data events; and
    program code configured for outputting an alarm.

12. The non-transitory computer readable medium of claim 11, further comprising program code configured for storing the previously calculated running value and the previous data event value in a cache.

13. The non-transitory computer readable medium of claim 11, wherein the program code configured for analyzing the running value includes a first level analysis that generates an alert in real time when the running value breaks a threshold.

14. The non-transitory computer readable medium of claim 13, wherein the program code configured for analyzing the running value includes a second level analysis that analyzes the running value using historical data in a non-real time fashion.

15. A method of processing a stream of data events to detect trends, comprising:
    obtaining, using a computing device, a new data event value;
    updating, using the computing device, a running value based on a previously calculated running value and a difference DV between the new data event value ($V_i$) and a previous data event value ($V_{i-1}$), wherein the running value is calculated as $(1-K)*DV^2+K*RDVV_{i-1}$, where K is a half-life based smoothing factor that dictates a period over which a decline in data event values is analyzed;
    updating a running mean calculated as follows: $RDV_i=(1-K)*DV+K*RDV_{i-1}$;
    updating a running standard deviation calculated as follows: $RSDD=sqrt(RDVV_i-RDV_i^2)$; and
    analyzing, using the computing device, the running value, running mean, and running standard deviation to detect trends in the stream of data events.

16. The method of claim 15, further comprising storing the running value and the new data event value in a cache for use in a next calculation.

17. The method of claim 15, wherein analyzing the running value includes:
    generating an alert in real time when the running value breaks a threshold using a first level analysis; and
    analyzing the running value using historical data in a non-real time fashion.

* * * * *